US010306415B2

(12) United States Patent
Xiao et al.

(10) Patent No.: US 10,306,415 B2
(45) Date of Patent: May 28, 2019

(54) METHOD FOR POSITIONING USING WIRELESS SIGNAL AND POSITIONING SERVER

(71) Applicant: Huawei Technologies Co., LTD., Shenzhen (CN)

(72) Inventors: Dengkun Xiao, Shenzhen (CN); Jie Cui, Shenzhen (CN); Wen Xiong, Shenzhen (CN); Hong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 319 days.

(21) Appl. No.: 14/310,504

(22) Filed: Jun. 20, 2014

(65) Prior Publication Data
US 2014/0323153 A1    Oct. 30, 2014

Related U.S. Application Data

(63) Continuation of application No. PCT/CN2012/087255, filed on Dec. 24, 2012.

(30) Foreign Application Priority Data

Dec. 22, 2011 (CN) .......................... 2011 1 0435473

(51) Int. Cl.
*H04W 24/00* (2009.01)
*H04W 4/02* (2018.01)
*G01S 5/02* (2010.01)

(52) U.S. Cl.
CPC ........... *H04W 4/027* (2013.01); *G01S 5/0252* (2013.01)

(58) Field of Classification Search
CPC ........ G06G 7/76; H04W 64/00; H04W 4/027; H04W 4/02; H04W 64/006; G01S 5/02; G01S 19/46; G01S 19/09; G01S 5/0252; G01S 19/00; H04B 17/00; H04B 17/001
USPC ................. 455/456.1, 456.2, 456.3, 457
See application file for complete search history.

(56) References Cited

U.S. PATENT DOCUMENTS

| 7,715,849 B2* | 5/2010 | Spirito et al. ............... 455/456.1 |
| 9,317,867 B2* | 4/2016 | Johnson ............ G06F 17/30867 |
| 2006/0089153 A1* | 4/2006 | Sheynblat ............. G01S 5/0252 455/456.1 |

(Continued)

FOREIGN PATENT DOCUMENTS

| CN | 1645967 A | 7/2005 |
| CN | 101099404 A | 1/2008 |

(Continued)

*Primary Examiner* — Khawar Iqbal
(74) *Attorney, Agent, or Firm* — Brinks Gilson & Lione

(57) ABSTRACT

The embodiments of the present invention provide a method for positioning using wireless signal and a positioning server. The coverage area of wireless signal is divided into multiple grids. The method comprises: acquiring speed information of UE; and determining a grid, in which the UE is located, based at least upon the speed information of the UE and speed information of the grids. Accordingly, according to the embodiments of the present invention, when the UE is positioned by using the wireless signal, the grid in which the UE is located is determined by using the speed information of the UE and the speed information of the grids, so that pattern matching may be performed more accurately and the positioning precision is improved.

16 Claims, 12 Drawing Sheets

(56) References Cited

U.S. PATENT DOCUMENTS

| | | | |
|---|---|---|---|
| 2006/0105815 A1* | 5/2006 | Jendbro et al. | 455/566 |
| 2008/0102756 A1* | 5/2008 | Lehtinen | G01S 5/00 455/67.11 |
| 2009/0209282 A1* | 8/2009 | Kobayashi | H04W 28/18 455/552.1 |
| 2009/0310593 A1* | 12/2009 | Sheynblat | H04J 3/0638 370/350 |
| 2010/0049744 A1 | 2/2010 | Zhao | |
| 2010/0211300 A1* | 8/2010 | Jaffe | G08G 1/0104 701/119 |
| 2011/0039517 A1 | 2/2011 | Wigren et al. | |
| 2013/0217419 A1* | 8/2013 | Jodlauk | H04W 4/021 455/456.3 |
| 2016/0198297 A1* | 7/2016 | Jodlauk | H04W 4/021 455/456.3 |
| 2018/0255528 A1* | 9/2018 | Ronen | G01S 5/0252 |

FOREIGN PATENT DOCUMENTS

| | | |
|---|---|---|
| CN | 101346000 A | 1/2009 |
| CN | 101674523 A | 3/2010 |
| CN | 102264097 A | 11/2011 |

\* cited by examiner

```
-- ASN1START
ECID-SignalMeasurementInformation ::= SEQUENCE {
    primaryCellMeasuredResults  MeasuredResultsElement OPTIONAL,
    measuredResultsList         MeasuredResultsList,
      ueVelocity                UeVelocity
    ...
}

MeasuredResultsList ::= SEQUENCE (SIZE(1..32)) OF MeasuredResultsElement

MeasuredResultsElement ::= SEQUENCE {
    physCellId         INTEGER (0..503),
    cellGlobalId  CellGlobalIdEUTRA-AndUTRA            OPTIONAL,
    arfcnEUTRA         ARFCN-ValueEUTRA,
    systemFrameNumber
                       BIT STRING (SIZE (10))          OPTIONAL,
    rsrp-Result        INTEGER (0..97)                 OPTIONAL,
    rsrq-Result        INTEGER (0..34)                 OPTIONAL,
    ue-RxTxTimeDiff INTEGER (0..4095)                  OPTIONAL,
    ...
}-- ASN1STOP
```

Fig. 15(a)

```
MeasuredResultsValue ::= CHOICE {
    valueAngleOfArrival         INTEGER (0..719),
    valueTimingAdvanceType1     INTEGER (0..7690),
    valueTimingAdvanceType2     INTEGER (0..7690),
    resultRSRP                  ResultRSRP,
    resultRSRQ                  ResultRSRQ,
   ueVelocity                   UeVelocity ...
}
```

Fig. 15(b)

```
MeasResultForECID-r9 ::=    SEQUENCE {
    ue-RxTxTimeDiffResult-r9        INTEGER (0..4095),
    currentSFN-r9                   BIT STRING (SIZE (10))
   ueVelocity            UeVelocity
}
```

Fig. 15(c)

METHOD FOR POSITIONING USING WIRELESS SIGNAL AND POSITIONING SERVER

CROSS-REFERENCE TO RELATED APPLICATIONS

This application is a continuation of International Application No. PCT/CN2012/087255, filed on Dec. 24, 2012, which claims priority to Chinese Patent Application No. 201110435473.0, filed on Dec. 22, 2011, both of which are hereby incorporated by reference in their entireties.

FIELD OF THE INVENTION

The present invention relates to wireless communications, and more particularly, to a method for positioning using wireless signal and a positioning server.

BACKGROUND OF THE INVENTION

Positioning technology is a technology adopted for determining the geographical position of user equipment (UE), and position information of the UE may be directly or indirectly acquired by using the resource of a wireless communication network.

At present, with continuous development of the mobile communication technology, the requirement for positioning service is also increasing, and some new positioning methods, such as a radio frequency pattern matching (RFPM) positioning method, namely an radio frequency pattern matching method or an electric signal pattern matching method, appear. This method is simple, feasible and higher in positioning precision, and is a key developed positioning technology in the future. The pattern matching positioning technology needs to construct a backstage database and store a drive test or estimated electric signal characteristic value (such as power, round-trip time (RTT) and the like) and a geographical position in the database in a mutual corresponding mode. When the UE needs to be positioned, the matched geographical position is searched through the actual signal characteristic value reported by the UE. The RFPM precision may be higher than the precisions of traditional OTDOA (Observed Time Difference of Arrival) and E-CID (Enhanced Cell Identification).

The RFPM has the advantages of higher positioning precision and wide application range, may be used for UE positioning of a non-line-of-sight network (at this moment, a GPS (Global Positioning System) is unavailable or has large error), has no requirement for the network synchronization performance, and does not need to upgrade the existing hardware.

However, the RFPM positioning technology needs to compare the measurement quantity of the UE with electric signal information of each small grid and the like, and when a wireless coverage network is larger, this work needs to consume a lot of time and energy.

Since the RFPM positioning technology finally needs to match measurement information with information in the database and determine the position of the successfully matched grid as the position of the UE, the precision of the technology is closely related to the size of the grid; and when the grid is larger, the positioning precision is poor. Secondly, since the measurement value obtained in actual positioning measurement may be similar to the information of multiple grids, an error grid may be selected during grid matching to cause a positioning error. Moreover, the pattern matching value is not single (different positions have similar signal characteristics), so the technical problems how to solve the uniqueness in pattern matching and how to reasonably utilize more available resources to improve the matching reliability need to be solved.

SUMMARY OF THE INVENTION

The embodiments of the present invention provide a method for positioning using wireless signal and a positioning server, which may perform pattern matching more accurately and improve the positioning precision.

According to one aspect of the embodiments of the present invention, a method for positioning using wireless signal is provided. The coverage area of wireless signal is divided into multiple grids. The method comprises: acquiring speed information of UE; and determining a grid, in which the UE is located, based at least upon the speed information of the UE and speed information of the grids.

According to another aspect of the embodiments of the present invention, a positioning server for positioning using wireless signal is provided. The coverage area of wireless signal is divided into multiple grids. The positioning server comprises: an information acquiring component, configured to acquire speed information of UE; and a grid determining component, configured to determine the grid, in which the UE is located, based at least upon the speed information of the UE and speed information of the grids.

According to the embodiments of the present invention, when the UE is positioned by using the wireless signal, the grid where the UE is located is determined by using the speed information of the UE and the speed information of the grids, so that pattern matching may be performed more accurately and the positioning precision is improved.

BRIEF DESCRIPTION OF THE DRAWINGS

To illustrate technical solutions in the embodiments of the present invention more clearly, a brief introduction on the accompanying drawings which are needed in the description of the embodiments or the prior art is given below. Apparently, the accompanying drawings in the description below are merely some of the embodiments of the present invention, based on which other accompanying drawings may be obtained by those of ordinary skill in the art without any creative effort.

FIG. 15(a) to FIG. 15(c) show exemplary signaling formats according to the embodiments of the present invention.

EMBODIMENTS OF THE INVENTION

A clear and complete description of technical solutions in the embodiments of the present invention will be given below, in combination with the accompanying drawings in the embodiments of the present invention. Apparently, the embodiments described are merely a part, but not all, of the embodiments of the present invention. All of other embodiments, obtained by those of ordinary skill in the art based on the embodiments of the present invention without any creative effort, fall into the protection scope of the present invention.

The technical solutions of the present invention may be applied to various communication systems, such as a global system for mobile communications (GSM), a code division multiple access (CDMA) system, a wideband code division multiple access wireless (WCDMA) system, a time division-synchronous code division multiple access (TD-SCDMA) system, a CDMA 2000 system, a long term evolution (LTE) system and the like.

User equipment (UE) may also be called as a mobile terminal, mobile user equipment, a mobile user and the like, and may communicate with one or more core networks through a radio access network (RAN). The mobile terminal may be a mobile terminal such as a mobile phone (or called as "cell" phone) or a computer with a mobile terminal, for example, may be a portable, pocket-type, handheld, computer built-in or vehicle-mounted mobile device, which exchanges languages and/or data with the RAN.

A base station may be a base transceiver station (BTS) in GSM or CDMA, a NodeB in WCDMA or an eNB or e-NodeB (evolutional Node B) in LTE, which is not specially limited in the present invention.

Moreover, a positioning server may be network side equipment, which may be separate equipment such as a core network element and provide service for multiple mobility management entities (MME). Each MME may provide service for multiple base stations.

A radio frequency pattern matching (RFPM) positioning method is a novel positioning method. According to the method, a wireless coverage area is divided into small grids first, and a wireless pattern database is established for each grid, wherein these pattern data may include various measurement information, such as identification (ID) of a serving cell, signal intensity of a serving base station received by a user, signal intensity of a neighboring base station (namely neighboring cell) received by the user, time advance (TA) information of the serving cell, angle of arrival (AoA) information and the like. Herein, the wireless coverage area may be a wireless coverage range of a few base stations or all base stations of the same operator.

Figure 1:
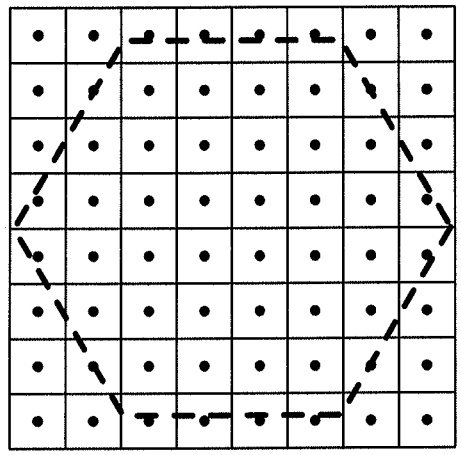
FIG. 1 shows an example of cell gridding according to an embodiment of the present invention.

FIG. 1 shows an example of cell gridding according to an embodiment of the present invention.

As shown in FIG. 1, each small block divided by solid lines represents a grid. In the example shown in FIG. 1, there are totally 8*8 grids, and the hexagon shown by dash lines represents a wireless coverage range of a cell. The size of each grid may be determined according to the factors such as positioning precision requirement, processing capability of a background database and the like. Preferably, the size of each grid may be 10 m*10 m or 20 m*20 m. The signal characteristic of the center point of a grid may represent the characteristic of the grid for matching.

According to the embodiment of the present invention, when the UE is positioned by using wireless signal, the grid where the UE is located is determined by using speed information of the UE and speed information of each grid, so that pattern matching may be performed more quickly and accurately.

Figure 2:
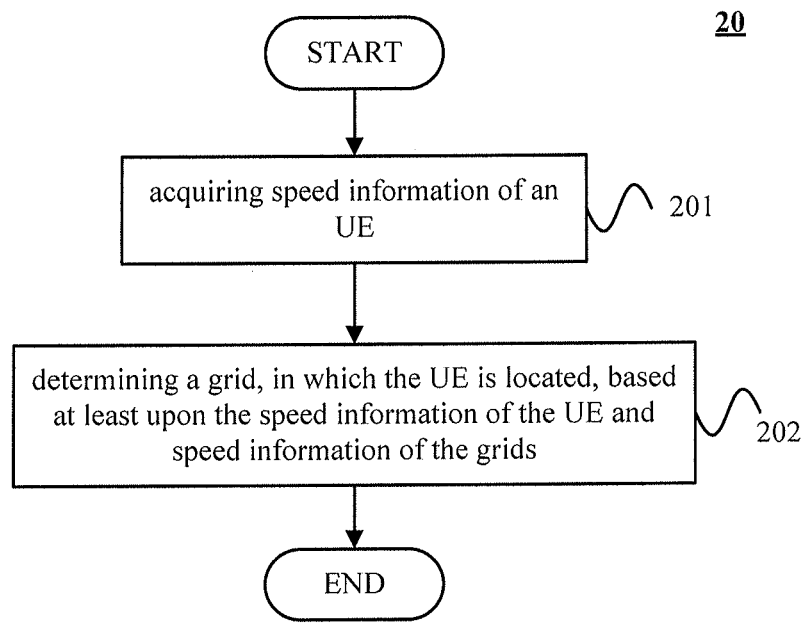
FIG. 2 shows a flowchart of an exemplary method according to an embodiment of the present invention.

FIG. 2 shows a flowchart of an exemplary method 20 according to an embodiment of the present invention, wherein, the coverage area of wireless signal is divided into multiple grids. The exemplary method 20 may be executed by a positioning server.

As shown in FIG. 2, in 201 of the method 20, speed information of UE is acquired.

In 202, the grid where the UE is located is determined at least based on the speed information of the UE and speed information of the grids.

Accordingly, according to the embodiment of the present invention, when the UE is positioned by using the wireless signal, the grid where the UE is located is determined by using the speed information of the UE and the speed information of the grids, so that pattern matching may be performed more accurately and the positioning precision is improved.

The specific implementations of the present invention are described below in combination with an RFPM positioning method, but do not limit the embodiments of the present invention, and may be applied to other positioning methods.

The grid where the UE is located may be determined on the basis of the speed information and pattern data information of the UE and the speed information and pattern data information of the grids, in combination with the RFPM positioning method.

According to the first specific implementation of the present invention, when the UE is positioned, the positioning server matches the measurement quantity of received wireless pattern data such as signal intensity of a neighboring cell, TA information, angle-of-arrival information and the like reported by the UE first, namely executes RFPM positioning. As described later, the pattern data information of each grid may be obtained through drive test or estimation and a database is established for matching. After the RFPM positioning is executed, generally, multiple matched candidate grids may be obtained. Then, improbable candidate grids are excluded by additionally using the speed information of the UE, finally the final grid where the UE is located is obtained.

Moreover, according to the second specific implementation of the present invention, when the UE is positioned, the positioning server excludes improbable grids by using the speed information of the UE and the speed information of the grids to determine candidate grids, and then matches the measurement quantity of received wireless pattern data such as signal intensity of a neighboring cell, TA information, angle-of-arrival information and the like reported by the UE by using RFPM positioning to obtain the final grid where the UE is located.

Moreover, the speed information and pattern data information of the UE may be compared with the speed information and pattern data information of each grid simultaneously to determine the information matched grid as the final grid where the UE is located.

Certainly, the present invention is not limited to this, and may also adopt other specific implementations.

The specific embodiments according to the present invention are further described below with reference to the accompanying drawings.

Figure 3:
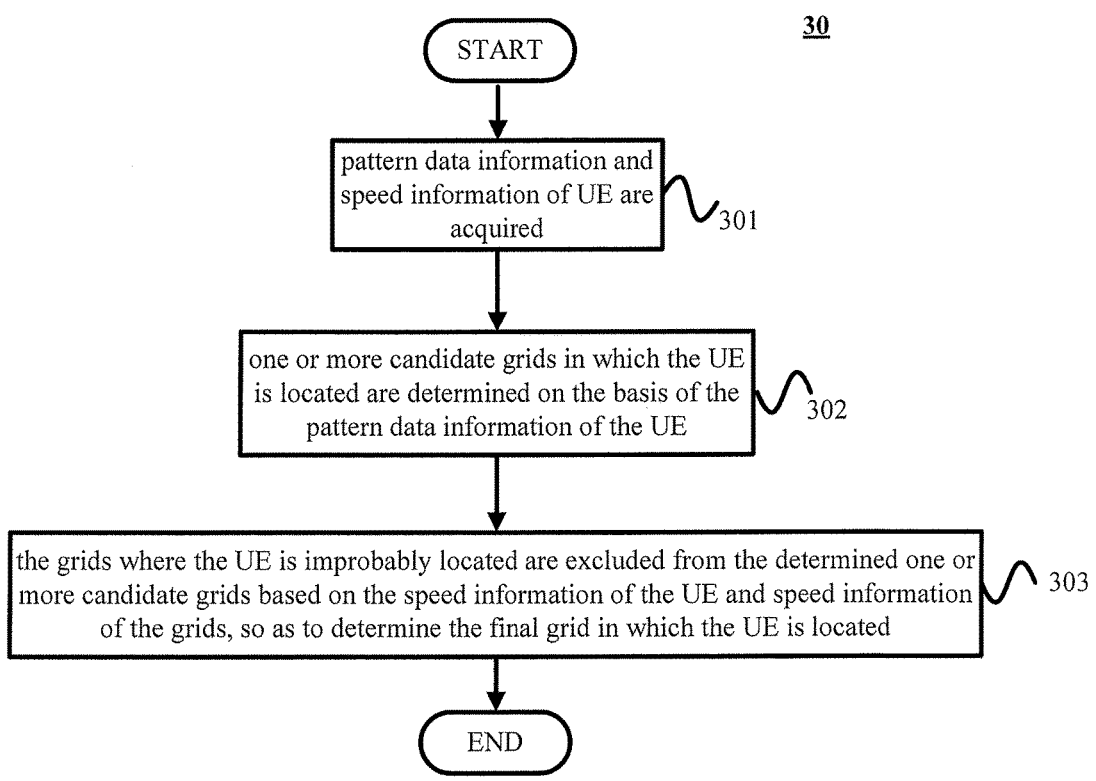
FIG. 3 shows an exemplary flowchart of a method for positioning according to the first specific implementation of the present invention.

FIG. 3 shows an exemplary flowchart of a method 30 for positioning according to the first specific implementation of the present invention.

The coverage area of wireless signal is divided into multiple grids, and the wireless coverage area may be a wireless coverage range of a few base stations or all base stations of the same operator.

As shown in FIG. 3, in 301 of the method 30, pattern data information and speed information of UE are acquired.

In 302, one or more candidate grids in which the UE is located are determined on the basis of the pattern data information of the UE.

In 303, the grids where the UE is improbably located are excluded from the determined one or more candidate grids based on the speed information of the UE and speed information of the grids, so as to determine the final grid where the UE is located.

According to the embodiment of the present invention, during positioning, RFPM positioning is executed first, the candidate grids are acquired through matching of pattern data, and then the final grid may be determined from the multiple candidate grids by using the speed information of the UE, so that the positioning result is unique, and reliability and precision of pattern matching are improved.

Those skilled in the art should understand that, under the condition that merely one candidate grid is acquired, the candidate grid may be directly used as the final grid without considering the speed information of the UE. However, the candidate grid may be further determined as the final grid by using the speed information of the UE, so that the reliability of pattern matching is further improved. In addition, when the quantity of the acquired final grids is more than one, other methods may be used for screening.

Moreover, although the positioning server simultaneously acquires the pattern data information and speed information of the UE in 301 as shown in FIG. 3, the present invention is not limited to this, and the pattern data information of the UE and the speed information of the UE may be acquired respectively at any appropriate time as considered by those skilled in the art.

For the pattern data information, table 1 below shows an example of a database mapping table of the pattern data information of RFPM.

TABLE 1

| Grid Index | Grid Position (x, y) | TA(t, s, . . .) | RSRP(t, s, . . .) | AoA(t, s, . . .) | Other |
|---|---|---|---|---|---|
| 1 | x1, y1 | — | — | — | — |
| 2 | X2, y2 | — | — | — | — |
| 3 | X3, y3 | — | — | — | — |
| . . . | . . . | — | — | — | — |

In table 1, the grid position is expressed in the form of x-y coordinates, wherein, TA(t, s, . . . ) expresses time advance information; RSRP(t, s, . . . ) expresses reference signal receiving power information, and may be signal intensity of a serving base station received by a user or signal intensity of a neighboring base station received by the user; AoA(t, s, . . . ) expresses angle of arrival information; and so on. The AoA information may be uplink AoA information estimated by the base station side.

The wireless pattern data in an RFPM database are not limited to this, and those skilled in the art may select any appropriate data as required to create the RFPM database for matching.

According to the embodiment of the present invention, in the above-mentioned parameters, t expresses time, and s expresses scenario.

Specifically, according to the embodiment of the present invention, the wireless pattern data in the RFPM database may be related to the time t, namely the wireless pattern data of the same grid position at different time are different. For example, the TA values of the same position may be different during vehicle-mounted test or propagation loss estimation at different time points, e.g., the TA value in wee hours may be different from that during rush hour.

Moreover, the wireless pattern data may also be related to the scenario s (sunny, rainy, winter, summer and the like), namely the characteristic values of the same grid position under different scenarios are different. For example, the TA values of the same position may be different during vehicle-mounted test under the rainy and sunny scenarios, and the TA values of the same position may also be different in winter and summer. Although weather and season are used as examples of the scenarios herein, the embodiment of the present invention is not limited to this, and those skilled in the art may adopt other contents as the scenarios as required, such as different festivals, various emergencies and the like.

When the UE reports its own pattern data information, the positioning server may determine the positioning time of the UE according to the reporting time of the UE, determine a cell according to the serving cell and then judge the scenario and the like.

The pattern data information of the UE may be matched with the pattern data information of each grid by using the minimal Euclidean distance. However, the present invention is not limited to this, and those skilled in the art may adopt other methods for matching as required.

Accordingly, according to the embodiment of the present invention, when the information reported by the UE is matched with the wireless pattern data in the RFPM database, not only does the pattern data reported by the UE need to be investigated, but also the information, such as the reporting time, scenario and the like, needs to be investigated. However, the embodiment of the present invention is not limited to this, and the wireless pattern data may be related to the time and scenario or only one of the time and scenario or other factors. In this way, the pattern matching implemented according to the embodiment of the present invention is more exquisite and accurate.

Figure 4:
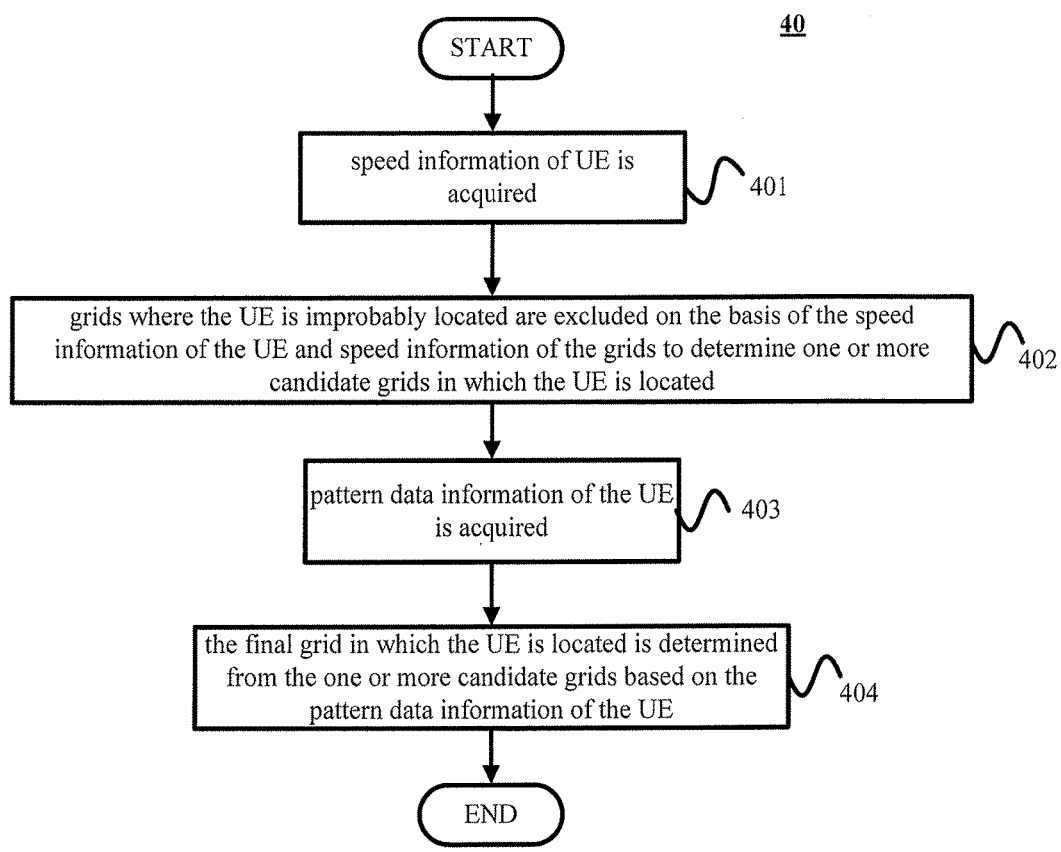
FIG. 4 shows an exemplary flowchart, of a method for positioning according to the second specific implementation of the present invention.

FIG. 4 shows an exemplary flowchart of a method 40 for positioning according to the second specific implementation of the present invention.

The coverage area of wireless signal is divided into multiple grids, and the wireless coverage area may be a wireless coverage range of a few base stations or all base stations of the same operator.

As shown in FIG. 4, in 401 of the method 40, speed information of UE is acquired.

In 402, grids where the UE is improbably located are excluded on the basis of the speed information of the UE and speed information of the grids to determine one or more candidate grids where the UE is located.

In 403, pattern data information of the UE is acquired.

In 404, the final grid where the UE is located is determined from the one or more candidate grids based on the pattern data information of the UE.

In the first specific implementation according to the present invention, the candidate grids are acquired first through matching of the pattern information data of the UE, which needs to compare the pattern information data of the UE with the information of each grid in the database; and because the pattern data information includes multiple measurement quantities, the workload is huge. Then, the improbable grids are excluded from the candidate grids by using the speed information of the UE and the speed information of the grids, so as to determine the final grid. By contrast, in the second specific implementation according to the present invention, the improbable grids are excluded first by using the speed information of the UE and the speed information of the grids to determine multiple candidate grids; and because the speed information is merely one measurement quantity, the calculation quantity is lower compared with the first specific implementation according to the present invention. Then, the improbable grids are excluded from the candidate grids by using the pattern data information of the UE, so as to determine the final grid.

Moreover, although FIG. 4 shows that the positioning server acquires the pattern data information of the UE in 403 after the speed information of the UE is acquired in 401, the present invention is not limited to this, and the pattern data information of the UE and the speed information of the UE may be acquired respectively at any appropriate time as considered by those skilled in the art.

During speed comparison, the speed information of each grid may be a speed range.

According to the embodiment of the present invention, preferably, the speed range of each grid may be acquired on the basis of a GIS (Geographical Information System). Certainly, the present invention is not limited to this, and the speed information of each grid may be acquired by those skilled in the art through other means, such as consulting an urban road map and the like.

The GIS is a specific very important spatial information system. The GIS is a technical system for acquiring, storing, managing, calculating, analyzing, displaying and describing related geographical distribution data in the whole of or a part of earth surface space under the support of hardware and software systems of a computer. Whereas the regional GIS, such as an urban GIS, is used for acquiring and storing information such as street information, landmark buildings, residential area coordinates and the like.

The grids of which the speed information needs to be known are mapped to a GIS map. The GIS map has basic information of streets, residential areas and the like, and each area has a corresponding speed range, so that the speed range of each grid may be easily and quickly acquired and used as the speed information of the grid. The grids which do not accord with the speed of the UE may be excluded through corresponding of the grids on the GIS map at the positioning server end in combination with the speed information of the UE, so that the grid where the UE is located may be selected more accurately.

Figure 5:
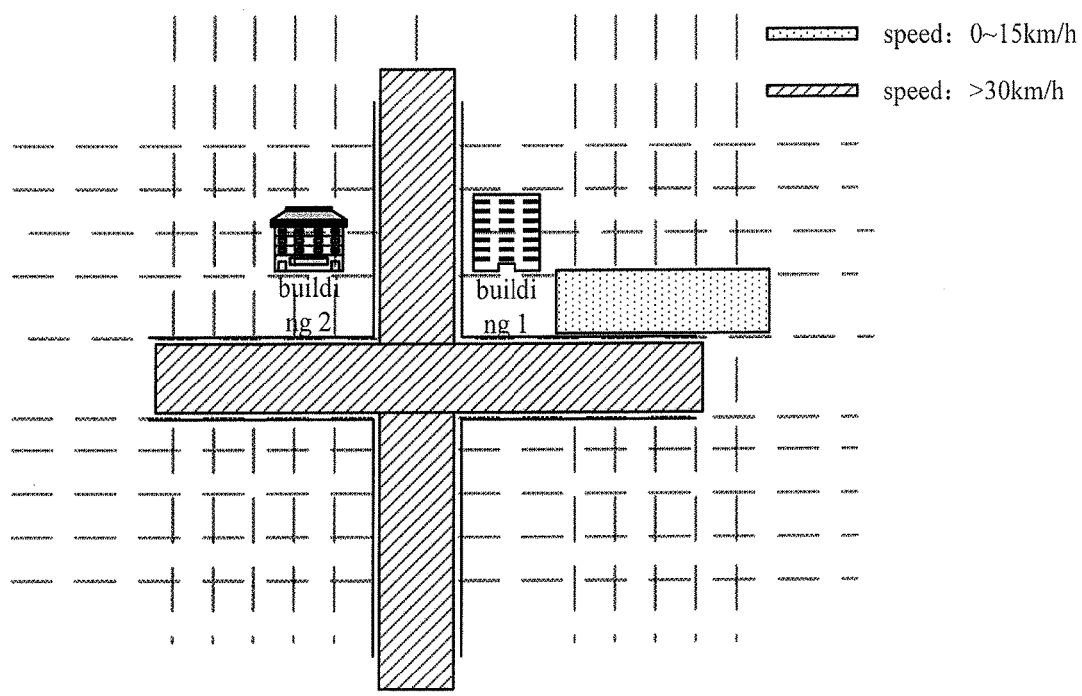
FIG. 5 shows a schematic diagram of a part of a GIS map according to an embodiment of the present invention.

FIG. 5 shows a schematic diagram of a part of a GIS map according to an embodiment of the present invention.

As shown in FIG. 5, the schematic diagram includes buildings such as a building 1 and a building 2, streets (shown with oblique lines), a residential area (shown with dots) and the like, wherein, the street areas are the ones capable of permitting vehicles to run normally, so the speed range of the street areas may be more than 30 km/h (kilograms/hour), while the speed of the residential area is apparently lower and may be within 0-15 km/h for example.

Accordingly, for example, according to the first specific implementation of the present invention, after one or more candidate grids are obtained by using an RFPM method, the candidate grids are mapped to a GIS map to obtain the speed range of each candidate grid. For example, when the candidate grids are positioned in the residential area, the speed ranges of the candidate grids may be 0-15 km/h; and when the candidate grids are positioned in the streets, the speed ranges of the candidate grids may be more than 30 km/h. Thereafter, the speed ranges of the candidate grids are compared with the acquired speed information of the UE, then the improbable candidate grids may be excluded, and the final grid where the UE is located is determined.

Figure 6:
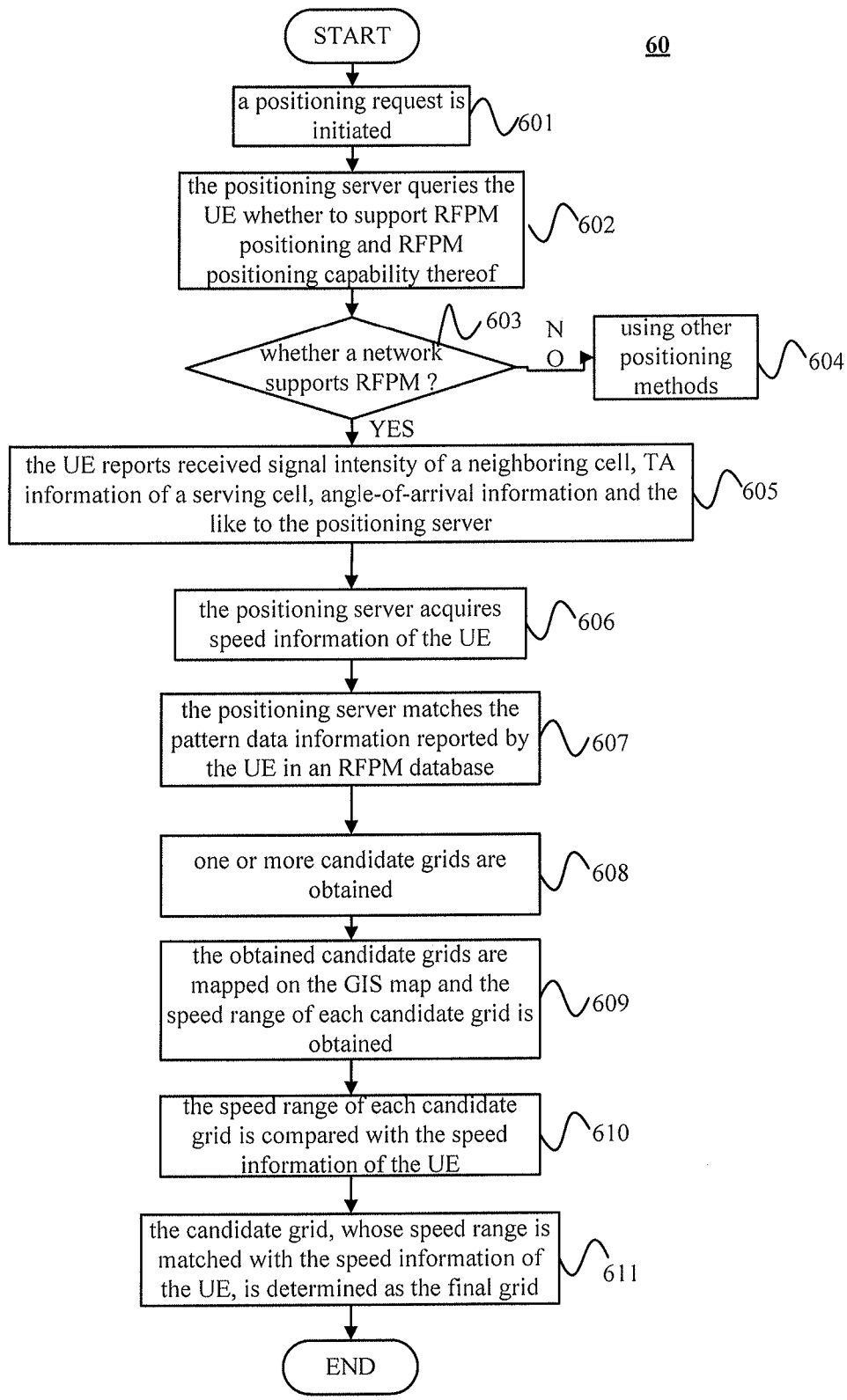
FIG. 6 shows a flowchart of an exemplary method for executing RFPM positioning based on the GIS map according to the first specific implementation of the present invention.

FIG. 6 shows a flowchart of an exemplary method 60 for executing RFPM positioning based on a GIS map according to the first specific implementation of the present invention.

As shown in FIG. 6, in 601 of the method 60, a positioning request is initiated. The positioning request may be initiated to a positioning server by UE. Moreover, when a base station needs to know the position of the UE, the positioning request may also be initiated by the base station. However, the present invention is not limited to this, and the positioning request may also be triggered by other events.

In 602, the positioning server queries the UE whether to support RFPM positioning and RFPM positioning capability thereof.

In 603, the positioning server judges whether a network supports the RFPM positioning. If so, a process is performed to 405, otherwise, the process is performed to step 404, so that positioning is performed by using other positioning methods, such as traditional network-aided GNSS (Global Navigation Satellite System) positioning, downlink positioning (OTDOA (Observed Time Difference Of Arrival) mode), E-CID (Enhanced Cell Identification) positioning or the like.

The processes in 602 and 603 are irrelevant to the subject involved in the present invention, so the descriptions of the processes are omitted herein.

In 605, the UE reports received pattern data information such as signal intensity of a neighboring cell, TA information of a serving cell, angle-of-arrival information and the like to the positioning server.

In 606, the positioning server acquires speed information of the UE.

In 607, the positioning server matches the pattern data information (the received signal intensity of the neighboring cell, TA information of the serving cell, angle-of-arrival information and the like) reported by the UE in an RFPM database.

In 608, the positioning server obtains one or more candidate grids.

In 609, the positioning server maps the obtained candidate grids on the GIS map to obtain the speed range of each candidate grid.

In 610, the positioning server compares the speed range of each candidate grid with the speed information of the UE.

In 611, the positioning server determines the candidate grid, whose speed range is matched with the speed information of the UE, as the final grid.

Thereafter, the positioning server may inform the UE or the base station of the position (such as coordinates) corresponding to the final grid.

Preferably, when the speed of the UE is within the speed range of the candidate grid, the speed information of the UE may be determined to be matched with the speed range of the candidate grid.

According to the embodiment of the present invention, the speed range of each candidate grid may be easily acquired by using the GIS map, and the final grid is determined by comparing the speed range of each candidate grid with the speed information of the UE, so that reliability and precision of pattern matching are improved, and time and cost are saved.

It should be noted that, although the positioning server acquires the speed information of the UE in 606 after the UE reports the pattern data information (such as the received signal intensity of the neighboring cell, TA information of the serving cell, angle-of-arrival information and the like) in 605 as shown in the embodiment, the present invention is not limited to this. That is to say, the positioning server may acquire the speed information of the UE at the same time (or time period) when the UE reports the pattern data information, or, the positioning server acquires the speed information of the UE after one or more candidate cells are obtained in 607. Certainly, the speed information may also be acquired at any time before speed comparison in 409.

When the speed information of the UE is acquired may depend on whether the UE supports speed measurement. For example, when the UE supports the speed measurement, the UE may simultaneously report the pattern data information and speed information thereof to the positioning server, namely the positioning server may simultaneously acquire the pattern data information and speed information of the UE; and when the UE does not support the speed measurement, the positioning server may know that the UE does not support the speed measurement after the pattern data information of the UE is acquired, so that the positioning server or the UE needs to calculate a speed quantity according to other quantities as the speed information of the UE, and thus at this moment, the positioning server, may acquire the speed information of the UE at other time.

Moreover, similar to the foregoing description, under the condition that merely one candidate grid is acquired in 608, the candidate grid may be directly used as the final grid without considering the speed information of the UE. However, the candidate grid may be further determined as the final grid by using the speed information of the UE, so that the reliability of pattern matching is further improved.

A few more detailed exemplary embodiments for acquiring the speed information of the UE according to the first specific implementation of the present invention through different methods are described below in combination with the accompanying drawings.

Figure 7:
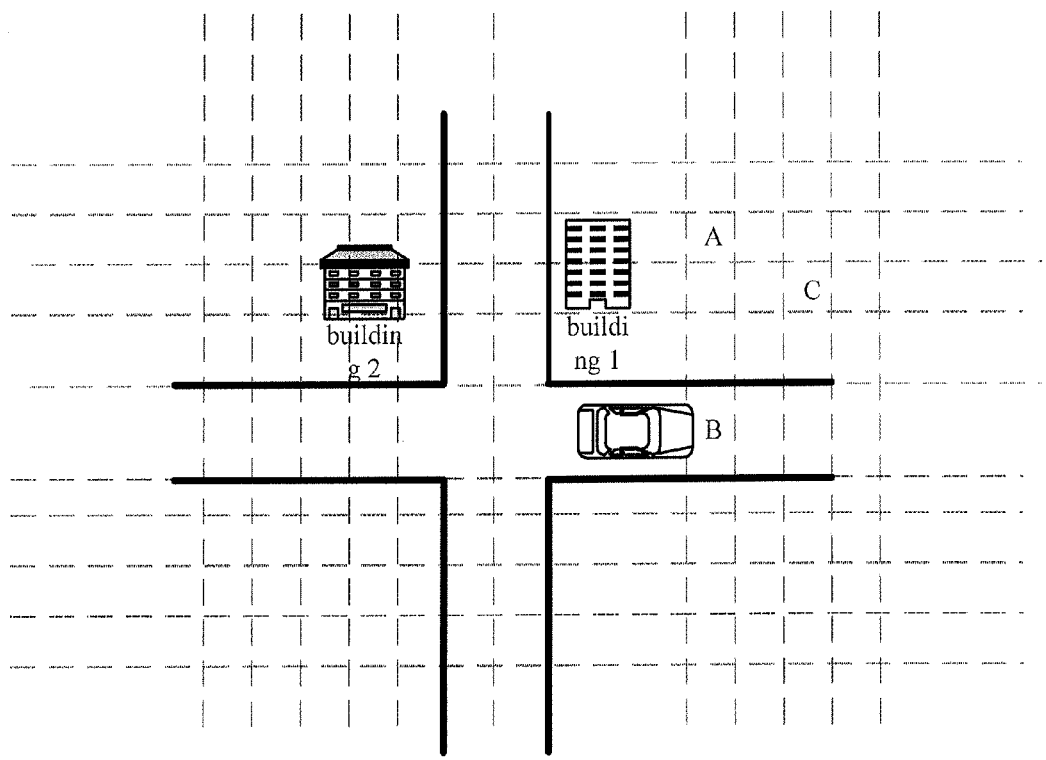
FIG. 7 shows a schematic diagram of executing RFPM positioning based on the GIS map according to the first specific implementation of the present invention.

FIG. 7 shows a schematic diagram of executing RFPM positioning based on the GIS map according to the first specific implementation of the present invention, wherein, UE supports speed measurement.

As shown in FIG. 7, in the example, suppose that the UE is located in a vehicle running on a road, for example, the UE may be located in a mobile phone held by a person in the vehicle or in a computer with a mobile function. When RFPM positioning is used, the UE may measure various electric signal and time information of a neighboring base station, and then reports the information to a positioning server. The positioning server matches the information with a database, so that three similar candidate grids A, B and C may be obtained. In the prior art, it is difficult to distinguish which grid the UE should be located in or the UE is positioned in an error grid through the existing information, so that the positioning precision declines.

According to the embodiment of the present invention, the positioning server maps the three similar candidate grids to the GIS map first, and then it may be discovered that the grid B is in a street, the speed range of the grid B should be more than 30 km/h, both the grid A and the grid C are in a residential area, and apparently, the speed ranges of the grid A and the grid C are not too high.

Under the condition that the UE supports the speed measurement, the UE may report other characteristic quantities to the positioning server and report its own current speed as the speed information at the same time. Certainly, the UE may also report its own speed information at other appropriate time. Suppose that the speed reported by the UE is 50 km/h, the unmatched candidate grids A and C may be excluded according to the speed ranges of the candidate grids A-C, and the candidate grid B is determined as the final grid, so that a positioning result is obtained.

Figure 8:
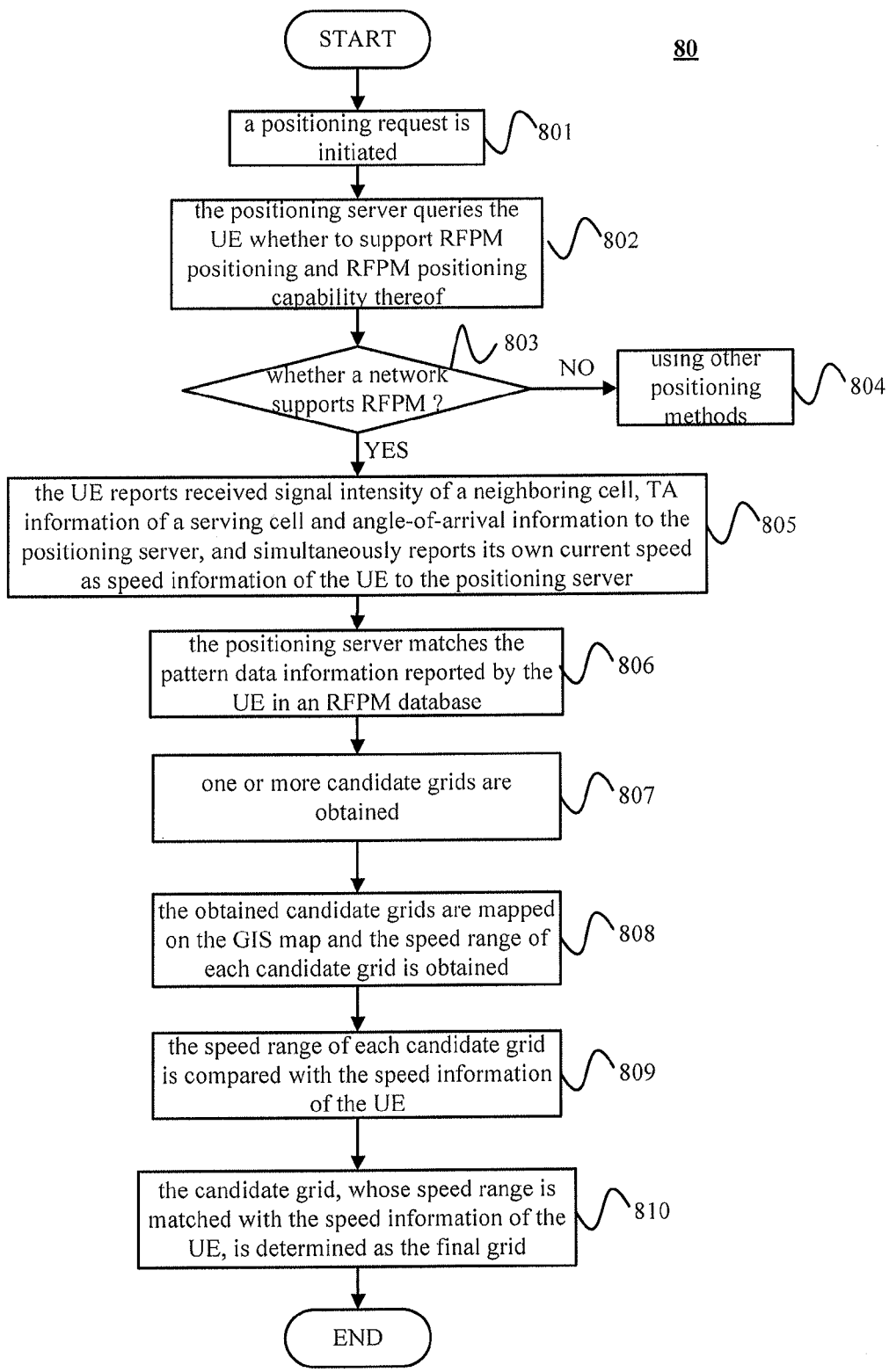
FIG. 8 shows a flowchart of a first method for executing RFPM positioning based on the GIS map according to the first specific implementation of the present invention.

FIG. 8 shows a flowchart of a first method 80 for executing RFPM positioning based on the GIS map according to the first specific implementation of the present invention, wherein, UE supports speed measurement.

As shown in FIG. 8, in 801 of the method 80, a positioning request is initiated. Similar to the foregoing description, the positioning request may be initiated to a positioning server by UE. Moreover, when a base station needs to know the position of the UE, the positioning request may also be initiated by the base station. However, the present invention is not limited to this, and the positioning request may also be triggered by other events.

In 802, the positioning server queries the UE whether to support RFPM positioning and RFPM positioning capability thereof.

In 803, whether a network supports the RFPM positioning is judged. If so, a process is performed to 805, otherwise, the process is performed to step 804, so that positioning is performed by using other positioning methods, such as traditional network-aided GNSS positioning, downlink positioning (OTDOA mode), E-CID positioning or the like.

In 805, the UE reports received signal intensity of a neighboring cell, TA information of a serving cell and angle-of-arrival information (such as uplink angle information) to the positioning server, and simultaneously reports its own current speed (for example, 50 km/h) as speed information of the UE to the positioning server.

In 806, the positioning server matches pattern data information (the received signal intensity of the neighboring cell, TA information of the serving cell, angle-of-arrival information and the like) reported by the UE in an RFPM database.

In 807, the positioning server obtains one or more candidate grids, such as candidate grids A, B and C.

In 808, the positioning server maps the obtained candidate grids on the GIS map to obtain the speed range of each candidate grid. For example, the speed ranges of the candidate grid A and the candidate grid C are 0-15 km/h, and the speed range of the candidate grid B is more than 30 km/h.

In 809, the positioning server compares the speed ranges of the candidate grids with the speed information of the UE.

In 810, the positioning server determines the candidate grid of which the speed range is matched with the speed information of the UE as the final grid where the UE is located. Specifically, since the speed of the UE falls within the speed range of the candidate grid B, the positioning server determines that the speed range of the candidate grid B is matched with the speed information of the UE, so as to determine the candidate grid B as the final grid where the UE is located.

Thereafter, the positioning server may inform the UE or the base station of the position (such as coordinates) corresponding to the final grid B.

It could be seen that, in the first method according to the first specific implementation of the present invention, the positioning server simultaneously acquires the wireless pattern data information and speed information of the UE in 806.

According to the embodiment of the present invention, during RFPM positioning, the speed ranges of the candidate grids are easily acquired by using the GIS map, and the final grid is determined by comparing the speed ranges of the candidate grids with the current speed of the UE, so that the RFPM positioning result is unique, and reliability and precision of pattern matching are improved.

Figure 9:
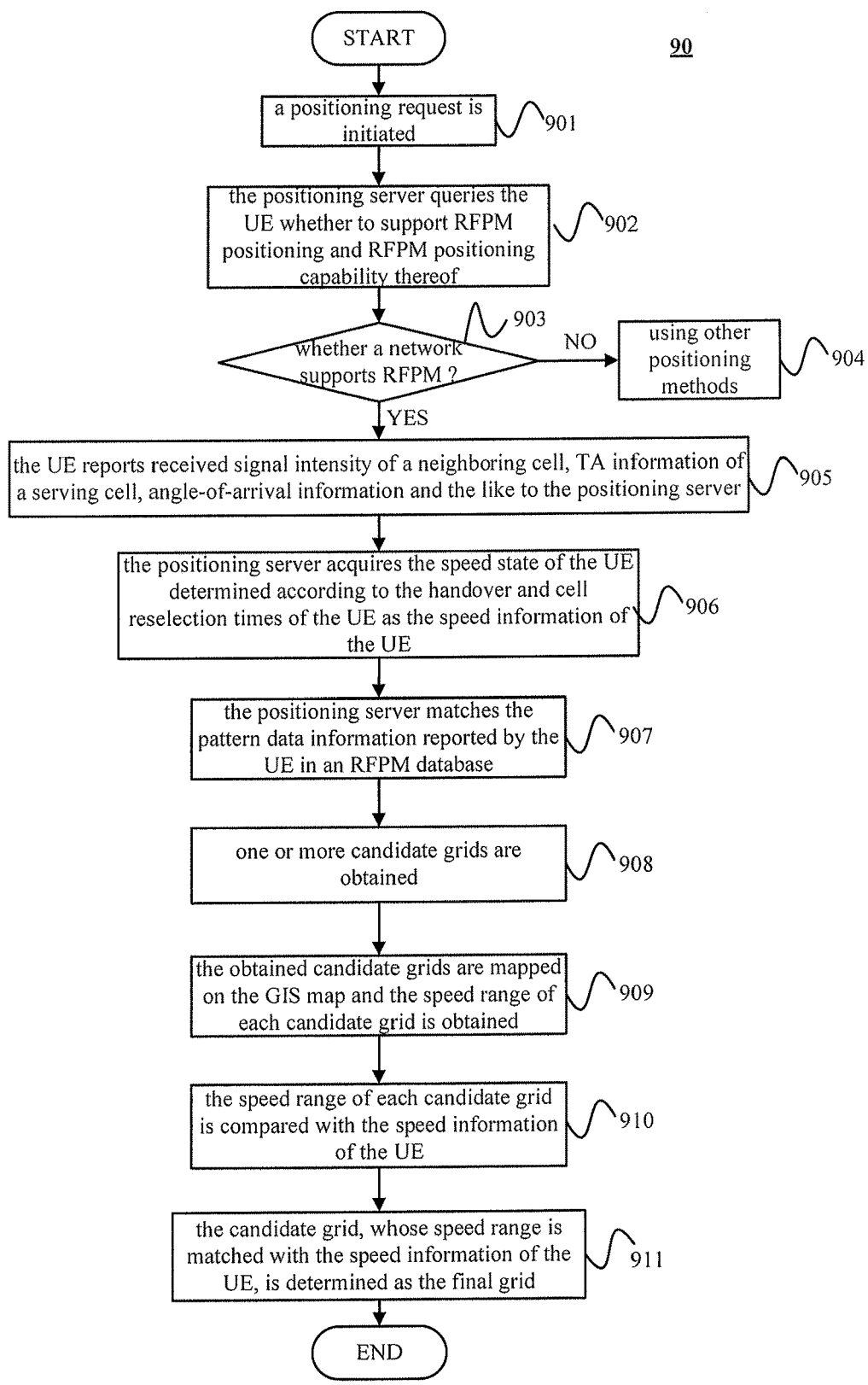
FIG. 9 shows a flowchart of a second method for executing RFPM positioning based on the GIS map according to the first specific implementation of the present invention.

FIG. 9 shows a flowchart of a second method 90 for executing RFPM positioning based on the GIS map according to the first specific implementation of the present invention, wherein, UE does not support speed measurement.

As shown in FIG. 9, processes 901 to 904 are similar to the processes 801 to 804 in FIG. 8, and will not be repeated redundantly herein.

In 905, the UE reports received signal intensity of a neighboring cell, TA information of a serving cell and angle-of-arrival information (such as uplink angle information) to the positioning server.

In 906, the positioning server acquires the speed state of the UE determined according to the handover and cell reselection times of the UE as the speed information of the UE. An MME (Mobility Management Entity) in a network side may determine the speed state of the UE according to the handover and cell reselection times of the UE and inform the positioning server. For example, when the handover and cell reselection times of the UE is bigger than a first predefined threshold $N_{CR\_H}$ within a predefined time period $T_{CRmax}$, the MME may judge that the UE is in a high-speed state, otherwise, the MME may judge that the UE is in a medium or low-speed state. Wherein, $T_{CRmax}$ is a movement cycle for judging the movement state of the UE, and $N_{cR\_H}$ is a maximal number of the reselection times for judging that the UE enters the high-speed movement state. Moreover, as known by those skilled in the art, the medium-speed state and the low-speed state may be further distinguished by additionally using a second predefined threshold $N_{CR\_M}$, wherein, $N_{CR\_M}$ is a maximal number of the reselection times for judging that the UE enters the medium-speed movement state. However, the present invention is not limited to this, and any appropriate specific value may be determined for the predefined time period $T_{CRmax}$, the first predefined threshold $N_{CR\_H}$ and the second predefined threshold $N_{CR\_M}$ by those skilled in the art according to the actual condition. Herein, still taking the condition shown in FIG. 7 as an example, suppose that the handover and cell reselection times of the UE within the time $T_{Crmax}$=60 s is 2 and is bigger than or equal to the first predefined threshold $N_{CR\_H}$=2, the MME judges that the UE is in the high-speed state, and the high-speed state is used as the speed information of the UE.

In 907, the positioning server matches pattern data information (the received signal intensity of the neighboring cell, TA information of the serving cell, angle-of-arrival information and the like) reported by the UE in an RFPM database.

In 908, the positioning server obtains one or more candidate grids, such as candidate grids A, B and C in FIG. 5.

In 909, the positioning server maps the obtained candidate grids on the GIS map to obtain the speed range of each candidate grid. For example, the speed ranges of the candidate grid A and the candidate grid C are 0-15 km/h, and the speed range of the candidate grid B is more than 30 km/h. Herein, since the speed information of the UE is divided into high speed and low speed, the positioning server may correspondingly divide the speed ranges of the candidate grids into high speed and low speed according to a third predefined threshold. Specifically, when the speed range of the candidate grid is more than 30 km/h, the candidate grid is judged to be at the high speed, otherwise, the candidate grid is judged to be at the medium or low speed. Herein, the positioning server judges the candidate grids A and C to be at the medium or low speed, and judges the candidate grid B to be at the high speed.

In 910, the positioning server compares the speed ranges of the candidate grids with the speed information of the UE.

In 911, the positioning server determines the candidate grid of which the speed range is matched with the speed information of the UE as the final grid where the UE is located. Specifically, since the speed states of both the candidate grid B and the UE are high speed, the positioning server determines that the speed range of the candidate grid B is matched with the speed information of the UE, so as to determine the candidate grid B as the final grid where the UE is located.

Thereafter, the positioning server may inform the UE or the base station of the position (such as coordinates) corresponding to the final grid B.

Moreover, it could be seen that, in the second method according to the first specific implementation of the present invention, after the UE reports the pattern data information to the positioning server in 905, the positioning server acquires the speed state of the UE as the speed information of the UE in 906, rather than simultaneously acquiring the wireless pattern data information and speed information of the UE in the first method according to the first specific implementation of the present invention.

However, the present invention is not limited to this, and the speed state of the UE may also be acquired at any time before the process 910.

According to the embodiment of the present invention, during RFPM positioning, the speed ranges of the candidate grids are easily acquired by using the GIS map, and the final grid is determined by comparing the speed ranges of the candidate grids with the speed state (high speed, medium speed and low speed or high speed and medium-low speed) of the UE. Compared with the first method according to the first specific implementation of the present invention, the second method merely may roughly acquire the speed state of the UE, which may also realize uniqueness of the RFPM positioning result, so that reliability and precision of pattern matching are improved.

Figure 10:
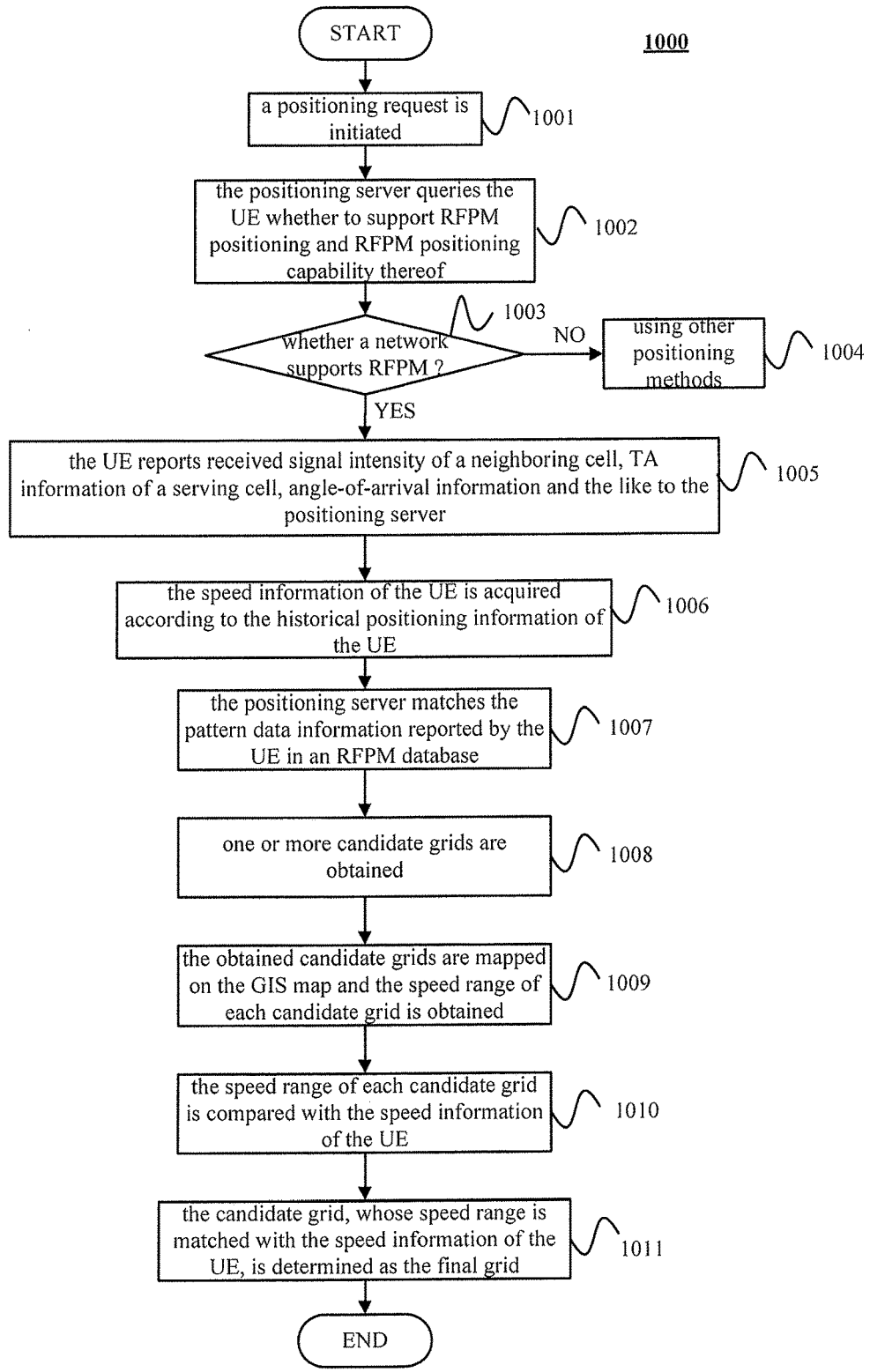
FIG. 10 shows a flowchart of a third method for executing RFPM positioning based on the GIS map according to the first specific implementation of the present invention.

FIG. 10 shows a flowchart of a third method 1000 for executing RFPM positioning based on the GIS map according to the first specific implementation of the present invention, wherein, UE does not support speed measurement.

As shown in FIG. 10, processes 1001 to 1004 and processes 1007 to 1011 are similar to the processes 801 to 804 and the processes 807 to 811 in FIG. 8, and will not repeated redundantly herein.

The difference between the third method according to the first specific implementation of the present invention and the first method according to the first specific implementation of the present invention is the mode of acquiring the speed information of the UE. In the first method, because the UE supports the speed measurement, the UE may directly report its own current speed as the speed information to the positioning server, while in the third method, since the UE does not support the speed measurement, the average speed of the UE may be calculated according to the historical positioning information of the UE and used as the speed information of the UE.

In 1005, the UE reports received signal intensity of a neighboring cell, TA information of a serving cell and angle-of-arrival information (such as uplink angle information and downlink angle information) to the positioning server.

In 1006, the speed information of the UE is acquired according to the historical positioning information of the UE.

For example, according to the historical positioning information of the UE, the position of the UE at the time T1 is P1(x1, y1), and the position of the UE at the time T2 is P2(x2, y2). Thus, the average speed of the UE may be calculated according to a formula $v=\sqrt{J(x2-x1)^2+(y2-y1)^2}/(T2-T1)$, and the average speed is used as the speed information of the UE. Because the positioning information of the UE is recorded in the positioning server, the calculation may be executed by the positioning server. Moreover, because the UE itself also records the previous positioning information, the calculation may also be executed by the UE. Under the condition that the UE executes the calculation, the UE needs to report the calculated average speed to the positioning server. Under the former condition, the speed state of the UE may be acquired by the positioning server at any time before process 1010. Under the latter condition, the UE may report the wireless pattern data information (including the received signal intensity of the neighboring cell, TA information of the serving cell and angle-of-arrival information) to the positioning server and report the calculated speed as the speed information to the positioning server at the same time.

Specifically, suppose that the UE is at the position P1 ($30\times10^3$, $50\times10^3$) (suppose that the unit is meter (m)) at the time T1=13:00 and at the position P2 ($110\times10^3$, $110\times10^3$) at the time T2=15:00, the average speed $v=\sqrt{(110-30)^2+(110-50)^2}\times1000$ m/(15-13)h=50 km/h of the UE may be obtained according to the above-mentioned formula.

Still taking the condition in FIG. 7 as an example, the positioning server may determine the grid B as the final grid and inform the UE or the base station of the position (such as coordinates) corresponding to the final grid B.

According to the embodiment of the present invention, during RFPM positioning, the speed ranges of the candidate grids are easily acquired by using the GIS map, and the final grid is determined by comparing the speed ranges of the candidate grids with the average speed of the UE, so that the RFPM positioning result is unique, and reliability and precision of pattern matching are improved.

Moreover, according to the embodiment of the present invention, the mode of acquiring the speed information of the UE may also be flexibly selected according to whether the UE supports the speed measurement, so that the flexibility of application is increased. Certainly, the present invention is not limited to this, and the speed information of the UE may also be acquired by those skilled in the art in other modes. Moreover, which mode is adopted to acquire the speed information of the UE may be determined by those skilled in the art according to other factors (such as design precision requirement and calculation capability), rather than judging merely according to whether the UE supports the speed measurement.

It should be noted that, no matter which mode is adopted to acquire the speed information of the UE, the speed information of the UE needs to be acquired before the speed information of the UE is compared with the speed ranges of the candidate grids, and the embodiment of the present invention does not need to be executed in a sequence shown in FIG. 8 to FIG. 10.

Moreover, although the exemplary flows in FIG. 8 to FIG. 10 aim at the first specific implementation of the present invention, the exemplary flows may be applied to the second specific implementation of the present invention by those skilled in the art based on appropriate changes to achieve similar effects. Since the processes are similar, detailed description of the processes is omitted herein.

Figure 11:
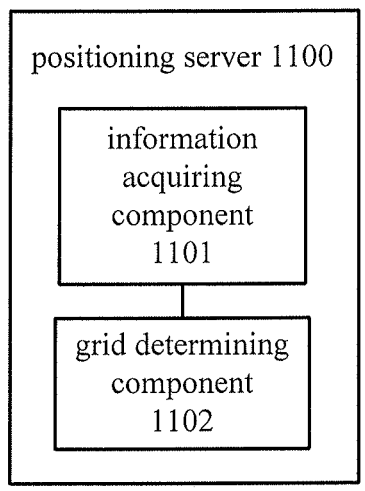
FIG. 11 shows an exemplary block diagram of a structure of a positioning server according to an embodiment of the present invention.

FIG. 11 shows an exemplary block diagram of a structure of a positioning server 1100 according to an embodiment of the present invention. The positioning server 1100 may be located on a network side.

As shown in FIG. 11, the positioning server 1100 may include an information acquiring component 1101 and a grid determining component 1102.

The information acquiring component 1101 is configured to acquire speed information of UE. The grid determining component 1102 is configured to determine the grid where the UE is located at least based on the speed information of the UE and speed information of the grids.

Accordingly, according to the embodiment of the present invention, when the UE is positioned by using wireless signal, the grid where the UE is located is determined by using the speed information of the UE and the speed information of the grids, so that pattern matching may be performed more accurately and the positioning precision is improved.

All parts of the positioning server 1100 may execute the related steps shown in FIG. 8 to FIG. 10, which will not be repeated redundantly herein for convenience.

When the UE does not support speed measurement, the information acquiring component 1101 in the positioning server 1100 may obtain a function of acquiring the speed information of the UE through the handover and cell reselection times of the UE within a predefined time period or through the historical positioning information of the UE.

Figure 12:
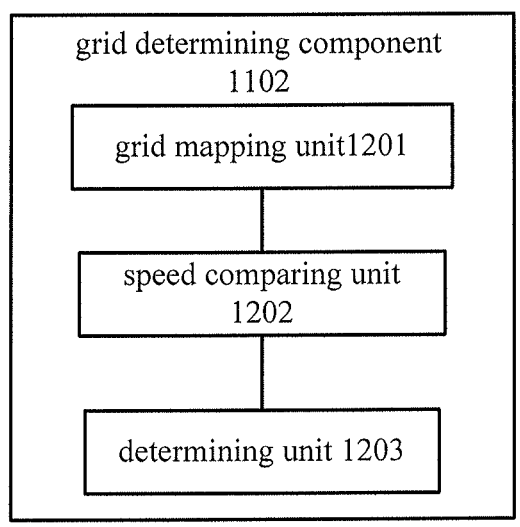
FIG. 12 shows an exemplary block diagram of a specific structure of a grid excluding component in the positioning server according to an embodiment of the present invention.

FIG. 12 shows an exemplary block diagram of a specific structure of the grid determining component 1102 in the positioning server according to an embodiment of the present invention.

As shown in FIG. 12, the grid determining component 1102 may include a grid mapping unit 1201, a speed comparing unit 1202 and a determining unit 1203.

The grid mapping unit 1201 is configured to map grids to a GIS to obtain the speed ranges of the grids, wherein the speed ranges of the grids are used as the speed information of the grids. The speed comparing unit 1202 is configured to compare the speed ranges of the grids with the speed information of UE. The determining unit 1203 is configured to determine the grid of which the speed range is matched with the speed information of the UE as the grid where the UE is probably located and exclude the remaining grids.

Figure 13:
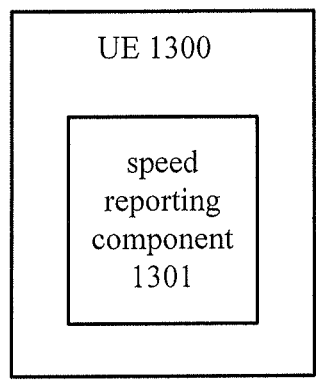
FIG. 13 shows an exemplary block diagram of a structure of UE according to an embodiment of the present invention.

FIG. 13 shows an exemplary block diagram of a structure of UE 1300 according to an embodiment of the present invention.

As shown in FIG. 13, the UE 1300 may include a speed reporting component 1301, which is configured to report the speed information of the UE to a positioning server during positioning with RFPM. Under the condition that the UE supports speed measurement, what is reported by the speed reporting component 1301 may be the current movement speed of the UE; and under the condition that the UE does not support the speed measurement, what is reported by the speed reporting component 1301 may be the calculated speed of the UE.

Accordingly, according to the embodiment of the present invention, when the UE is positioned by using wireless signal, the grid where the UE is located is determined by using the speed information of the UE and the speed information of the grids, so that pattern matching may be performed more accurately and the positioning precision is improved.

The UE 1300 may execute the related steps shown in FIG. 8 to FIG. 10, which will not be repeated redundantly herein for convenience.

Figure 14:
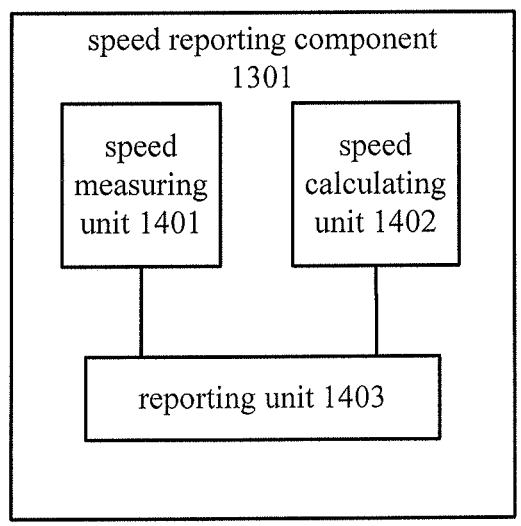
FIG. 14 shows an exemplary block diagram of a specific structure of a speed reporting component in the UE according to an embodiment of the present invention.

FIG. 14 shows an exemplary block diagram of a specific structure of the speed reporting component 1301 in the UE according to an embodiment of the present invention.

As shown in FIG. 14, the speed reporting component 1301 may include a speed measuring unit 1401, a speed calculating unit 1402 and a reporting unit 1403.

Under the condition that the UE 1300 supports speed measurement, the speed reporting component 1301 may merely include the speed measuring unit 1401 and the reporting unit 1403, wherein, the speed measuring unit 1401 is configured to measure the current movement speed of the UE, and the reporting unit 1403 is configured to report the current movement speed of the UE.

Under the condition that the UE 1300 does not support the speed measurement, the speed reporting component 1301 may merely include the speed calculating unit 1402 and the reporting unit 1403, wherein, the speed calculating unit 1402 is configured to calculate the speed of the UE according to the historical positioning information of the UE, and the reporting unit 1403 is configured to report the calculated speed of the UE.

FIG. 15(*a*) to FIG. 15(*c*) show exemplary signaling formats according to the embodiments of the present invention, wherein, FIG. 15(*a*) shows E-CID-SignalMeasurementInformation signaling in LPP (LTE Positioning Protocol), FIG. 15(*b*) shows MeasurementResult signaling of LPPa (LPPa is a signaling protocol for interacting between an eNB and a positioning server, and LPP is a signaling protocol for interacting between UE and the positioning server), and FIG. 15(*c*) shows MeasResuilts signaling in RRC (Radio Resource Control).

In addition, a positioning system according to an embodiment of the present invention may include the above-mentioned positioning server and UE.

It should be noted that, for clearness and briefness, FIG. 11 to FIG. 14 merely show the parts related to the embodiments of the present invention, but those skilled in the art should understand that, equipment or devices shown in FIG. 11 to FIG. 14 may include other necessary units.

Those of ordinary skill in the art could realize that the units and algorithmic steps of the examples described in combination with the embodiments disclosed in the present invention may be realized by electronic hardware, computer software or a combination of the both. For clearly illustrating the interchangeability between the hardware and the software, the composition and steps of each example have been generally described according to functions in the above-mentioned illustration. Whether these functions are executed in a hardware or software mode depends on the specific applications and design constraint conditions of the technical solutions. For each specific application, professionals may realize the described functions by different methods, but this realization should not be considered as being beyond the scope of the present invention.

Those skilled in the art to which the present invention pertains may clearly understand that, for the purpose of better convenience and briefness in description, for the specific working processes of the above-described systems, devices and units, reference could be made to the corresponding processes in the embodiments of the aforementioned methods, which will not be repeated redundantly herein.

In the several embodiments provided in the present application, it should be understood that the disclosed systems, devices and methods may be realized in other modes. For example, the embodiments of the above-described devices are merely exemplary, for example, the division of the units is merely a logic function division, other division modes may be adopted in practice, e.g., a plurality of units or components may be combined or integrated in another system, or some characteristics may be omitted or not executed. From another point of view, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on multiple network units. The objectives of the solutions of the embodiments may be fulfilled by selecting part of or all of the units according to actual needs.

In addition, in various embodiments of the present invention, the functional units may be integrated in one processing unit, or the functional units may separately and physically exist, or two or more units may be integrated in one unit. The above-mentioned integrated units may be realized in the form of hardware or in the form of a software functional unit.

When the integrated units are realized in the form of software functional units and sold or used as independent products, the integrated units may be stored in a computer-readable storage medium. Based on such an understanding, the technical solution of the present invention substantially, or the part of the present invention making contribution to the prior art, or all of or part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present invention. The aforementioned storage medium includes: various media capable of storing program codes, such as USB disk, mobile hard disk, read-only memory (ROM), random access memory (RAM), magnetic disk, optical disk or the like.

It should be noted that, in the device and method of the present invention, apparently, all components or all steps may be decomposed and/or recombined. These decompositions and/or recombination should be regarded as equivalent solutions of the present invention. Moreover, the abovementioned series of processing steps may be naturally executed according to the specified time sequence, but do not need to be definitely executed according to the time sequence. Some steps may be executed in parallel or mutually independently, for example, the process of acquiring the speed information of the UE may be executed according to a sequence different from that in the figures.

The foregoing descriptions are merely specific implementations of the present invention, rather than limiting the protection scope of the present invention. Any skilled one who is familiar with this art could readily think of variations or substitutions within the disclosed technical scope of the present invention, and these variations or substitutions shall fall within the protection scope of the present invention. Accordingly, the protection scope of the claims should prevail over the protection scope of the present invention

What is claimed is:

1. A method for positioning using wireless signal, wherein the coverage area of wireless signal is divided into multiple grids, comprising:
    acquiring speed information of user equipment (UE);
    determining which grid the UE is located in, based at least upon the speed information of the UE and speed information of the grids, wherein the speed information of the grids indicates an expected speed assigned to each of the grids;
    determining the location of the UE based on the grid which the UE is located in,
    wherein the speed information of the grids comprises speed ranges of the grids, the speed ranges of the grids indicate an expected speed range assigned to each of the grids, and the expected speed range assigned to each of the grids is determined by mapping the location of the grids to a geographic information system (GIS) map in which each area has a corresponding speed range, and the determining which grid the UE is located in, based at least upon the speed information of the UE and the speed information of the grids comprises:
    comparing the speed ranges of the grids with the speed information of the UE; and
    determining a grid, whose speed range is matched with the speed information of the UE, as the grid in which the UE is located, and
    acquiring pattern data information of the UE; and
    wherein the determining which grid the UE is located in, based at least upon the speed information of the UE and speed information of the grids, comprises:
    determining which grid the UE is located in, on the basis of the speed information and pattern data information of the UE and the speed information and pattern data information of the grids, wherein, the pattern data information of the grids is predefined.

2. The method according to claim 1, wherein the determining a grid, whose speed range is matched with the speed information of the UE, as the grid in which the UE is located, comprises:
    when the speed information of the UE is within the speed range of the grid, indicating that the speed information of the UE is matched with the speed range, and determining the grid as the grid in which the UE is located; and/or
    when the speed information of the UE is beyond the speed range of the grid, indicating that the speed information of the UE is not matched with the speed range, and excluding the grid whose speed range is not matched with the speed information of the UE.

3. The method according to claim 1, wherein the determining which grid the UE is located in, on the basis of the speed information and pattern data information of the UE and the speed information and pattern data information of the grids comprises:
    determining the grid, whose speed information is matched with the speed information of the UE and pattern data information is matched with the pattern data information of the UE, as the grid in which the UE is located.

4. The method according to claim 3, wherein the determining the grid, whose speed information is matched with the speed information of the UE and pattern data information is matched with the pattern data information of the UE, as the grid in which the UE is located, comprises:
    determining at least one candidate grid in which the UE is located according to one of the pattern data information and the speed information of the UE and the grids, and determining a final grid in which the UE is located according to the other of the pattern data information and the speed information.

5. The method according to claim 4, wherein the pattern data information of the UE and the grids is related to at least one of time and scenario.

6. The method according to claim 1, wherein the acquiring the speed information of the UE comprises:
    acquiring the speed information of the UE through speed reported by the UE; or
    acquiring the speed information of the UE through handover and cell reselection times of the UE; or
    acquiring the speed information of the UE through historical positioning information of the UE.

7. The method according to claim 6, wherein the speed reported by the UE is one of a current movement speed of the UE and calculated speed according to the historical positioning information of the UE.

8. The method according to claim 1, wherein the pattern data information of the UE comprises signal intensity of a neighboring cell, time advance (TA) information of a serving cell and angle-of-arrival information received by the UE, and the pattern data information of the grids comprises signal intensity of the neighboring cell, TA information of the serving cell and angle-of-arrival information received within the grids.

9. A positioning server for positioning using wireless signal, wherein the coverage area of wireless signal is divided into multiple grids, and the positioning server comprising:
    an information acquiring component, configured to acquire speed information of user equipment (UE) and to acquire pattern data information of the UE; and
    a grid determining component, configured to determine which grid the UE is located in and determine the location of the UE based on the grid which the UE is located in, based at least upon the speed information of the UE and speed information of the grids, wherein the speed information of the grids indicates an expected speed assigned to each of the grids, wherein the speed information of the grids comprises speed ranges of the grids, the speed ranges of the grids indicate an expected speed range assigned to each of the grids, and the expected speed range assigned to each of the grids is determined by mapping the location of the grids to a geographic information system (GIS) map in which each area has a corresponding speed range, and the grid determining component comprises:

a speed comparing unit, configured to compare the speed ranges of the grids with the speed information of the UE; and a determining unit, configured to determine the grid, whose speed range is matched with the speed information of the UE, as the grid in which the UE is located, and wherein, the grid determining component determines which grid the UE is located in, on the basis of the speed information and pattern data information of the UE and the speed information and pattern data information of the grids, wherein, the pattern data information of the grids is predefined.

10. The positioning server according to claim 9, wherein, when the speed information of the UE is within the speed range of the grid, the determining unit determines that the speed information of the UE is matched with the speed range, and determines the grid as the grid in which the UE is located; and/or when the speed information of the UE is beyond the speed range of the grid, the determining unit determines that the speed information of the UE is not matched with the speed range and excludes the grid whose speed range is not matched with the speed information of the UE.

11. The positioning server according to claim 9, wherein, the grid determining component determines the grid, whose speed information is matched with the speed information of the UE and pattern data information is matched with the pattern data information of the UE, as the grid in which the UE is located.

12. The positioning server according to claim 11, wherein, the grid determining component determines at least one candidate grid in which the UE is located according to one of the pattern data information and the speed information of the UE and the grids, and determines a final grid in which the UE is located according to the other of the pattern data information and the speed information.

13. The positioning server according to claim 12, wherein the pattern data information of the UE and the grids is related to at least one of time and scenario.

14. The positioning server according to claim 9, wherein the information acquiring component acquires one of the speed information of the UE through speed reported by the UE, handover and cell reselection times of the UE and historical positioning information of the UE.

15. The positioning server according to claim 14, wherein the speed reported by the UE is one of a current movement speed of the UE and calculated speed according to the historical positioning information of the UE.

16. The positioning server according to claim 9, wherein the pattern data information of the UE comprises signal intensity of a neighboring cell, time advance (TA) information of a serving cell and angle-of-arrival information received by the UE, and the pattern data information of the grids comprises signal intensity of the neighboring cell, TA information of the serving cell and angle-of-arrival information received within the grids.

* * * * *